US005301505A

United States Patent [19]

Wright

[11] Patent Number: 5,301,505

[45] Date of Patent: Apr. 12, 1994

[54] FAIL SAFE LINEAR ACTUATOR SYSTEM

[76] Inventor: John J. Wright, 9 Hix Ave., Rye, N.Y. 10580

[21] Appl. No.: 985,924

[22] Filed: Dec. 4, 1992

[51] Int. Cl.[5] .......... F16D 31/02

[52] U.S. Cl. .......... 60/405; 60/413; 91/518; 91/459

[58] Field of Search .......... 60/403, 404, 405, 413, 60/414, 417, 415, 406; 91/518, 459

[56] References Cited

U.S. PATENT DOCUMENTS

| | | | |
|---|---|---|---|
| 3,348,378 | 10/1967 | Lemley | 60/404 |
| 3,680,311 | 8/1972 | Harbonn et al. | 60/404 X |
| 3,753,350 | 8/1973 | Nott | 60/404 X |
| 4,065,094 | 12/1977 | Adams | 60/404 X |
| 4,217,968 | 8/1980 | Dezelan | 60/404 X |
| 4,268,228 | 5/1981 | McKee | 91/518 X |
| 4,476,677 | 10/1984 | Hanshaw | 60/405 X |
| 4,574,904 | 3/1986 | Goode | 60/404 X |
| 4,953,445 | 9/1990 | Kervagoret et al. | 60/404 X |

*Primary Examiner*—Edward K. Look
*Assistant Examiner*—Hoang Nguyen

[57] ABSTRACT

A fail safe hydraulic system which includes a pressurized fluid storage which is capable of delivering fluid to the actuator to return it to its inoperative position should the actuator system suffer a loss of power and a apparatus for signaling a controller when the pressurized fluid storage has been charged with fluid, wherein fluid from the reservoir cannot be delivered to the actuator until the pressurized fluid storage has been charged with fluid.

5 Claims, 1 Drawing Sheet

FAIL SAFE LINEAR ACTUATOR SYSTEM

The present invention relates generally to a fail safe hydraulic actuator system which is capable of returning an externally associated valve to its fail safe or inoperative position in the event of loss of electrical power to the system.

BACKGROUND OF THE INVENTION

Linear actuators with piston means displaced by fluid or air pressure are typically used to control the opening and closing of valves, e.g., gate valves, globe valves, sluice gates and cone valves.

Many situations exist where electrically operated control mechanisms, such as the valves just noted, and the like, if locked in an operative position by an interruption of electric power, can create awkward, difficult, and even hazardous conditions.

The present inventor has created a fail safe hydraulic actuator system, particularly one featuring a linear actuator, which upon loss of electric power instantly and automatically returns the control mechanism which is being monitored to the inoperative position (i.e., either open or closed). Moreover, the present invention provides a unique means for controlling the fail safe means whereby fluid can not be delivered to the linear actuator until a pressurized storage means has been charged with sufficient fluid so as to enable the storage means to return the linear actuator to its inoperative position in the event of a power loss.

The present inventor is not aware of any other fail safe electric linear actuator which automatically returns the control mechanism to its inoperative position during a power loss. U.S. Pat. No. 4,757,684 (Wright), which issued on Jul. 19, 1988, discloses the use of a reversible means for storing energy as a fail safe means on a rotary actuator. The reversible means for storing energy is attached to the fluid-driven vaned torque actuator by a shaft such that as the torque actuator is rotated by means of a fluid, the reversible means simultaneously stores energy. When the electric power supply is interrupted, a valve means is de-energized and opened, permitting energy stored in the reversible means to return the shaft, thereby restoring the fail safe actuator device and the control mechanism to their initial inoperative position. The reversible means for storing energy mechanically is a torsion spring. For space conservation, a flat clock type spring could be substituted for the torsion spring. It is also suggested that an accumulator having reverse power be used in place of the torsion spring. However, this patent does not describe how the flat clock type spring or accumulator would function as a fail safe device.

The present invention also provides many additional advantages which shall become apparent as described below.

SUMMARY OF THE INVENTION

A fail safe linear actuator system which includes a pressurized fluid storage means as its fail safe mechanism. The pressurized fluid storage means, e.g., an accumulator, must be capable of delivering fluid to the linear actuator so that it returns to its inoperative position should the linear actuator system suffer a loss of power. Additionally, the pressurized fluid storage means includes a means for signaling the controller of the system when the pressurized fluid storage means has been satisfactorily charged with fluid, wherein fluid from the reservoir is prevented from being delivered to the linear actuator until the pressurized fluid storage means has been charged with fluid.

The present invention is also directed to a method for returning a linear actuator to its inoperative position when a power loss occurs. The method comprises the steps of: supplying electric power to the fail safe linear actuator system of the present invention; closing a block valve and opening solenoid and isolation valves; charging fluid from the reservoir into the pressurized fluid storage means; signaling the controller when the pressurized fluid storage means is charged to a pre-determined level; closing the isolation valve and opening the solenoid and block valves; pumping fluid through the solenoid valve such that it is directed via a first conduit into a first fluid chamber of the linear actuator, whereby a piston rod is displaced in such a manner that an external associated valve is moved to its operative position; evacuating fluid from a second fluid chamber of the linear actuator via a second conduit contemporaneous with the pumping of fluid into the first fluid chamber, whereby the fluid from the second fluid chamber is delivered to the reservoir; opening the isolation, block and dump valves by default when the linear actuator system experiences a loss of power such that fluid stored within the pressurized fluid storage means is directed therefrom to the second fluid chamber of the linear actuator via the second conduit; and evacuating the first fluid chamber of the linear actuator contemporaneous with the delivery of fluid into the second fluid chamber, whereby the fluid from the first fluid chamber is delivered to the reservoir.

Other and further objects, advantages and features of the present invention will be understood by reference to the following specification in conjunction with the annexed drawing.

BRIEF DESCRIPTION OF THE DRAWINGS

The FIG. is a schematic diagram of the fail safe linear actuator system in accordance with the present invention.

DESCRIPTION OF THE PREFERRED EMBODIMENTS

Figure 1:
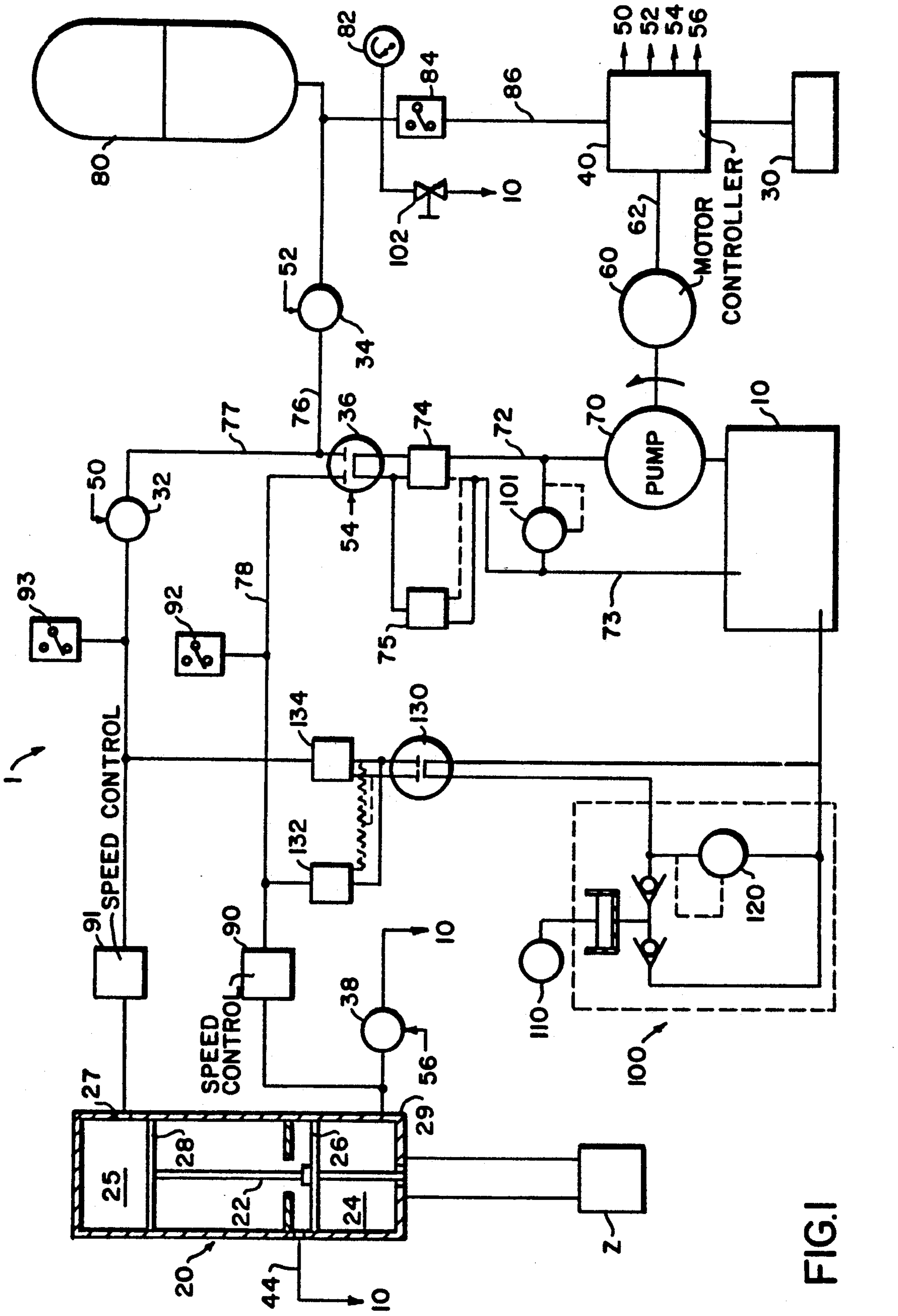

The present invention relates generally to linear actuators used to open and close gate valves, globe valves, sluice gates and cone valves. Thrust type hydraulic actuators are particularly useful linear actuators in such applications. One such thrust type hydraulic actuator, which includes a booster piston arrangement, is described in co-pending U.S. patent application, Ser. No. 07/818,300, filed on Jan. 9, 1992, which is incorporated herein by reference.

The fail safe linear actuator system provides for the associated external gate valve, globe valve, sluice gate or cone valve to move to the open or close position on loss of power to the system. This fail safe system is designed to produce the full thrust necessary to seat the valve. The emergency operation speed is independent of the normal operating speed and is field adjustable. This actuator offers positive protection to piping systems that are subject to damage on power failure. The system is entirely sealed.

These linear actuator systems provide the option of speed control which will allow independent speed adjustments for the open and close direction. These speeds can be factory set and permit field changes. This system also provides positive torque overload protection with hydraulic pressure switches in the open and closed position. Remote indication of the over torque status can also be provided.

Linear actuator systems can be modified with special relay controls, feedback linear transducers, indicating lights, interlocks and alarms to meet the requirements of any application.

The present invention can best be described by referring to attached FIG. 1, wherein fail safe linear actuator system 1 is capable of opening and closing an external valve 2, shown schematically, by supplying a hydraulic fluid from reservoir 10 to linear actuator 20 via a series of conduits and valves. At start-up or energizing, the operator switches the power source 30 to the "on" position. Power source 30 then sends electric current to controller 40 (which typically, would include a microprocessor with associated input and output lines) which then transmits signals to the pump motor and various valves disposed about the system conduits to control the fail sale operation of linear actuator 20.

Initially, controller 40 transmits a positive signal via output line 50 to close block valve 32, while it also transmits a zero, or default, signal via output line 52 to keep isolation valve 34 open. Another positive signal is transmitted via output line 54 to place solenoid valve 36 in a first open position. Subsequent to the opening of valves 34 and 36, and the closing of valve 32, controller 40 provides electrical power to pump motor 60 via output line 62 which activates reservoir pump 70. Pump 70 withdraws hydraulic fluid from reservoir 10 and delivers it via main conduit 72 and branch conduit 76 to pressurized fluid storage means 80. Pressurized fluid storage means 80, in the form of an accumulator, is charged with sufficient fluid, such that, in the event of an electrical power loss, means 80 is able, to return piston rod 22 of linear actuator 20 to its inoperative position (normally, the closed position for valve 2).

Once the pressure within pressurized fluid storage means 80 reaches a pre-determined level, as monitored by pressure gauge 82, pressure switch 84 is activated which, in turn, provides an enable signal to controller 40 via input line 86, such enable signal being indicative of the fact that pressurized fluid storage means 80 is at the appropriate fail safe level. Upon receiving such a signal from pressure switch 84, controller 40 is enabled for operation which closes isolation valve 34 and dump valve 38 (via output line 56), opens block valve 32, and places solenoid valve 36 in a second position such that fluid can now flow from reservoir 10 through main conduit 72 and thence through branch conduit 78 into fluid chamber 24 of linear actuator 20. Responsive to fluid entering this first fluid chamber, booster piston 26 and primary piston 28 move away from fluid entry/exit port 29, resulting in piston rod 22 moving into the upper, operative position; whereby the associated external valve 2 affixed to the outside end of piston rod 22 is opened. Simultaneously, fluid is removed from second fluid chamber 25 via entry/exit port 27 and returned to reservoir 10 via branch conduit 77 and main conduit 73. A relief valve 101 is preferably disposed between conduit 72 and conduit 73. A drain valve 102 is disposed between accumulator 80 and reservoir 10.

In order to move piston rod 22 into the inoperative position (i.e., away from entry/exit port 27), such position corresponding to the usual closed position for the external valve 2, three position, four-way solenoid valve 36 is placed into its third position by means of controller 40 such that fluid is pumped from reservoir 10 to second fluid chamber 25 via main conduit 72 and branch conduit 78. Fluid is drained from first fluid chamber 24 via both drain conduit 94 and entry/exit port 29 and thereafter returned to reservoir 10.

If power is lost while piston rod 22 is in the operative position such that the associated external valve 2 is, for example, open, then isolation valve 34, block valve 32 and dump valve 38 are all opened by default, (no electrical power present) allowing the fluid contained within pressurized fluid storage means 80 to flow via branch conduits 76 and 77 into second fluid chamber 25 causing piston rod 22 to return to its inoperative position. Since dump valve 38 is open, fluid contained in first fluid chamber 24 is readily evacuated to reservoir 10. Pilot-operated check valves 74 and 75 prevent flow back of fluid into the reservoir 10 at inappropriate times.

In the instance where it is necessary to operate linear actuator 20 during a power loss period, then an optional manual pump 100 can be provided. Manual pump 100 includes a hand pump 110, a relief valve 120 and a manual override solenoid valve 130 with associated pilot-operated isolation valves 132 and 134.

The system according to the present invention offers the unique option of speed control means (90,91) which allow independent speed adjustments for the open and close direction of linear actuator 20. Also, positive torque overload protection is provided with hydraulic pressure switches 92 and 93.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claim.

What is claimed is:

1. A fail safe actuator system which comprises:

a power source;

a controller, coupled to said power source, for transmitting control signals to selected components of said system;

a motor which is energized by said power source through said controller;

a pump means which is powered by said motor;

a fluid reservoir;

at least first, second, and third conduits;

at least first, second and third valves electrically connected to said controller for receiving said control signals;

an actuator comprising a first fluid chamber and a second fluid chamber, said first fluid chamber being in communication with said fluid reservoir via said first conduit and said second fluid chamber being in communication with said fluid reservoir via said second conduit;

means for changing fluid flow direction in both said first and second conduits;

a fail safe mechanism for returning the actuator to its inoperative position if the actuator system should lose electrical power, including a pressurized fluid storage means connected to said third conduit, said first valve being disposed within said third conduit for controlling fluid flow to and from said pressurized fluid storage means;

the second valve being disposed within said first conduit for controlling fluid flow between said pressurized fluid storage means and said actuator;

the third valve being operative for dumping fluid from said actuator when said actuator is being returned to its inoperative position;

means for signaling and automatically enabling said controller only when said pressurized fluid storage means has been sufficiently charged with fluid to provide fail safe operation, the controller otherwise being disabled from providing control signals to said valves, which signals would ordinarily permit fluid flow to said actuator.

2. A system as defined in claim 1, in which the system is a linear actuator system, including a piston rod; further comprising means, responsive to loss of power, for simultaneously opening said first, second and third valves, for thereby allowing the fluid contained within said pressurized fluid storage means to flow into said linear actuator so as to return said piston rod to its inoperative position.

3. A system as defined in claim 1, in which said means for changing fluid direction is a fourth valve.

4. The system according to claim 2, said system being a sealed system, in which said means for signaling said controller when said pressurized fluid storage means is charged with fluid includes a pressure gauge and a pressure switch.

5. The system according to claim 3, in which said fourth valve is a three position, four way, solenoid valve; said first valve is an isolation valve, said second valve is a block valve, and said third valve is a dump valve.

* * * * *